US007107530B2

(12) United States Patent
Blakely et al.

(10) Patent No.: US 7,107,530 B2
(45) Date of Patent: Sep. 12, 2006

(54) METHOD, SYSTEM AND PROGRAM PRODUCT FOR DISPLAYING A TOOLTIP BASED ON CONTENT WITHIN THE TOOLTIP

(75) Inventors: Jason Y. Blakely, Cary, NC (US); Robert S. Sielken, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 10/228,005

(22) Filed: Aug. 26, 2002

(65) Prior Publication Data

US 2004/0036714 A1    Feb. 26, 2004

(51) Int. Cl.
*G06F 3/00* (2006.01)
(52) U.S. Cl. ...................................... 715/711; 715/708
(58) Field of Classification Search ........ 715/705–715, 715/764, 765, 781, 866
See application file for complete search history.

(56) References Cited

U.S. PATENT DOCUMENTS

| | | | |
|---|---|---|---|
| 4,964,077 A * | 10/1990 | Eisen et al. .................. | 715/707 |
| 5,235,679 A | 8/1993 | Yoshizawa et al. | |
| 5,377,319 A | 12/1994 | Kitahara et al. | |
| 5,446,891 A | 8/1995 | Kaplan et al. | |
| 5,822,123 A | 10/1998 | Davis et al. | |
| 5,877,758 A * | 3/1999 | Seybold ...................... | 715/866 |
| 5,923,325 A | 7/1999 | Barber et al. | |
| 5,995,101 A * | 11/1999 | Clark et al. .................. | 715/711 |
| 6,295,061 B1 | 9/2001 | Park et al. | |
| 6,300,950 B1 | 10/2001 | Clark et al. | |
| 6,542,164 B1 * | 4/2003 | Graham ...................... | 715/711 |
| 2003/0171876 A1* | 9/2003 | Markowitz et al. ........... | 702/20 |
| 2003/0187716 A1* | 10/2003 | Lee .............................. | 705/10 |

FOREIGN PATENT DOCUMENTS

| | | |
|---|---|---|
| JP | 04-337828 | 11/1992 |
| JP | 05-284436 | 10/1993 |
| JP | 05-324250 | 12/1993 |
| JP | 06-231187 | 8/1994 |
| JP | 08-063316 | 3/1996 |
| JP | 10-241346 | 9/1998 |
| JP | 11-212727 | 8/1999 |
| JP | 2000-123006 | 4/2000 |
| JP | 2001-075704 | 3/2001 |
| JP | 2002-041220 | 2/2002 |
| JP | 2002041196 A | 2/2002 |

OTHER PUBLICATIONS

Japanese Office Action for IBM's, Date of Office Action Feb. 23, 2006, Listing of Cited References in 2 pages.

* cited by examiner

*Primary Examiner*—Lucila X. Bautista
(74) *Attorney, Agent, or Firm*—Ronald A. D'Alessandro

(57) ABSTRACT

A method, system and program product for displaying a tooltip based on content within the tooltip is provided. Under the present invention, a feature (e.g., size, type, complexity, etc.) of the content within a tooltip is first determined. Based on the feature, a display time for the tooltip is calculated. The tooltip is then displayed for the duration of the calculated display time, after which time the tooltip is closed.

25 Claims, 3 Drawing Sheets

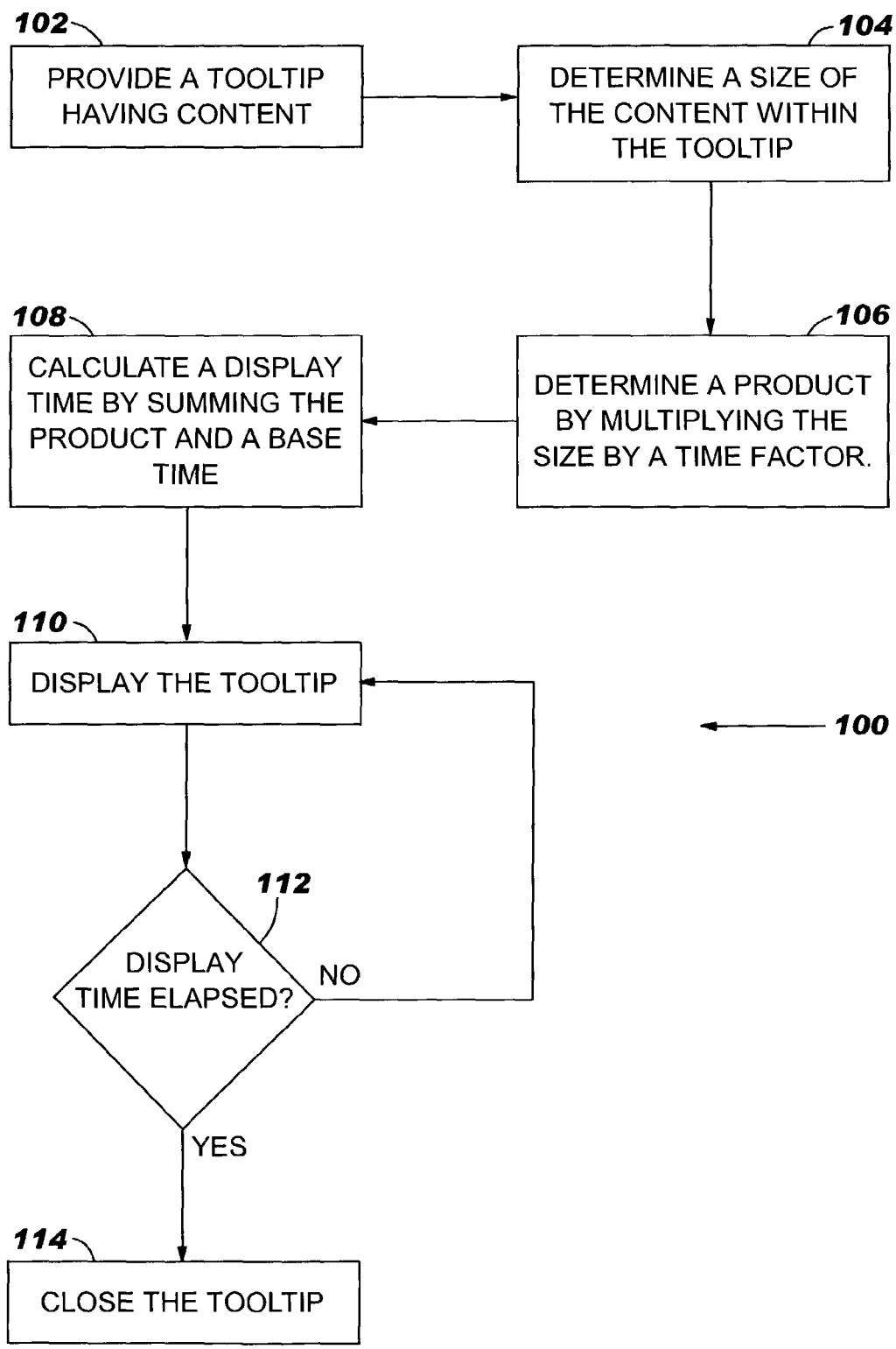

METHOD, SYSTEM AND PROGRAM PRODUCT FOR DISPLAYING A TOOLTIP BASED ON CONTENT WITHIN THE TOOLTIP

BACKGROUND OF THE INVENTION

1. Field of the Invention

In general, the present invention relates to a method, system and program product for displaying a tooltip. Specifically, the present invention displays a tooltip for a length of time that is dependent on a feature of the content within the tooltip.

2. Background Art

Tooltips have become an everyday source of information for a number of computer applications. Specifically, tooltips are textual or graphical labels that appear over an icon/control area in a graphical user interface (GUI). In general, a tooltip provides descriptive information about the functions of the underlying icon. Typically, a tooltip is displayed when a user points a mouse (or other input) device to the icon. When the user later selects the icon, moves the mouse device away from the icon, or performs some keyboard action, the tooltip is usually closed.

Unfortunately, as helpful as tooltips can be, they can also be a hindrance. For example, the tooltips often obstruct a portion of the computer display. Moreover, when the user is forced take some action such as moving the mouse device to close/hide a tooltip, the efficiency with which the underlying application operates is compromised. In addition, the amount of descriptive content within the tooltips can vary depending on the function being described. To this extent, a tooltip can include text, graphical representations, or a mixture of text and graphical representations. Accordingly, the amount of time it takes to observe and understand the content within the tooltip may vary.

Heretofore, attempts have been made to improve the nature by which tooltips are employed. In one attempt, a user is able to determine the "trigger" time for displaying a tooltip. That is, the user can select the length of time that must elapse before a tooltip can be displayed. No previous system, however, addresses the problems associated with the length of time a tooltip is displayed once it appears. As indicated above, tooltips can include content of varying size, type, or complexity, and it could be advantageous to display certain tooltips longer than others.

In view of the foregoing, there exists a need for a method, system and program product for displaying a tooltip based on content within the tooltip. A further need exists for a tooltip to be displayed for an amount of time that is based on a feature of the content therein. Still yet, a need exists for the tooltip to be closed when the calculated amount of display time has elapsed.

SUMMARY OF THE INVENTION

In general, the present invention provides a method, system and program product for displaying a tooltip based on content within the tooltip. In a typical embodiment, a size of the content within the tooltip is first determined. The size of the content can be determined based on any known measurement such as a quantity of characters, bytes, etc. In any event, once the size has been determined, a display time is calculated by using the size in a predetermined algorithm. The tooltip is then displayed for the duration of the calculated display time, after which the tooltip is closed.

According to a first aspect of the present invention, a method for displaying a tooltip based on content within the tooltip is provided. The method comprises: (1) determining a feature of the content within the tooltip; (2) calculating a display time for the tooltip based on the feature of the content; and (3) displaying the tooltip for the calculated display time.

According to a second aspect of the present invention, a method for displaying a tooltip based on content within the tooltip is provided. The method comprises: (1) determining a size of the content within the tooltip; (2) determining a product by multiplying the size by a predetermined time factor; (3) calculating a display time for the tooltip by summing the product and a base time; and (4) displaying the tooltip for the display time, wherein the tooltip is closed when the display time has elapsed.

According to a third aspect of the present invention, a system for displaying a tooltip based on content within the tooltip is provided. The system comprises: (1) a content system for determining a size of the content within the tooltip; (2) a time system for calculating a display time for the tooltip based on the size; and (3) a display system for displaying the tooltip for the calculated display time.

According to a fourth aspect of the present invention, a program product stored on a recordable medium for displaying a tooltip based on content within the tooltip is provided. When executed, the program product comprises: (1) program code for determining a size of the content within the tooltip; (2) program code for calculating a display time for the tooltip based on the size; and (3) program code for displaying the tooltip for the calculated display time.

Therefore, the present invention provides a method, system and program product for displaying a tooltip based on content within the tooltip.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram according to the present invention.

Figure 1:
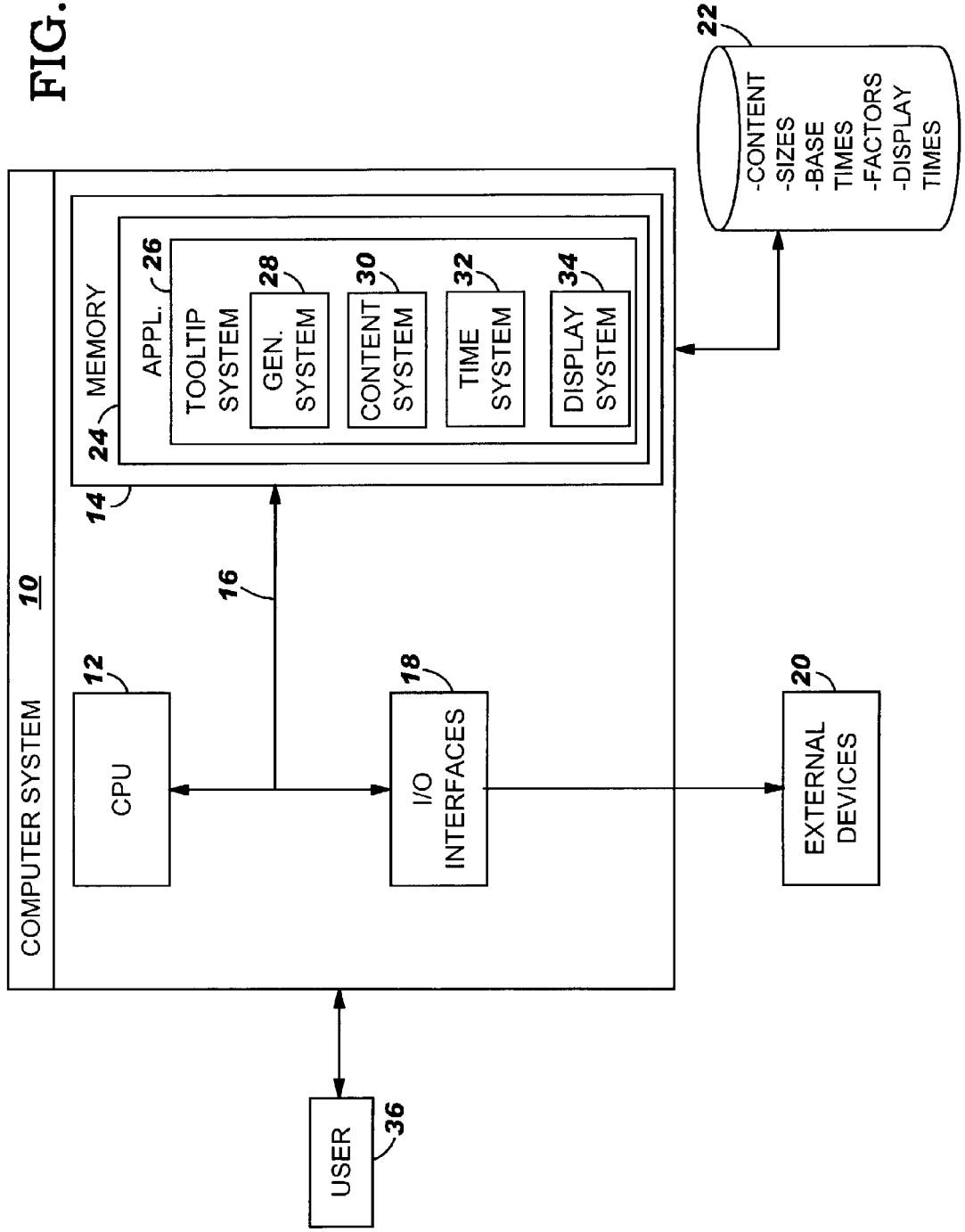
FIG. 1 depicts a computer system having a tooltip system according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAIL DESCRIPTION OF THE INVENTION

In general, the present invention provides a method, system and program product for displaying a tooltip based on the content within the tooltip. In a typical embodiment, a size of the content within the tooltip is first determined. The size of the content can be determined based on any known measurement such as a quantity of characters, bytes, etc. In any event, once the size has been determined, a display time is calculated by using the size in a predetermined algorithm. The tooltip is then displayed for the duration of the calculated display time, after which the tooltip is closed. As will be further described below, although the display time can be based on a size of the content, it could actually be based on any tangible feature of the content. For example, the display time could be calculated based on a type or complexity of the content within the tooltip.

Referring to FIG. 1, computer system 10 having a tooltip system 26 according to the present invention is shown. As depicted, computer system 10 generally includes central processing unit (CPU) 12, memory 14, bus 16, input/output (I/O) interfaces 18, external devices/resources 20 and database 22. CPU 12 may comprise a single processing unit, or be distributed across one or more processing units in one or more locations, e.g., on a client and server. Memory 14 may comprise any known type of data storage and/or transmission media, including magnetic media, optical media, random access memory (RAM), read-only memory (ROM), a data cache, a data object, etc. Moreover, similar to CPU 12, memory 14 may reside at a single physical location, comprising one or more types of data storage, or be distributed across a plurality of physical systems in various forms.

I/O interfaces 18 may comprise any system for exchanging information to/from an external source. External devices/resources 20 may comprise any known type of external device, including speakers, a CRT, LED screen, hand-held device, keyboard, mouse, voice recognition system, speech output system, printer, monitor, facsimile, pager, etc. Bus 16 provides a communication link between each of the components in computer system 10 and likewise may comprise any known type of transmission link, including electrical, optical, wireless, etc. In addition, although not shown, additional components, such as cache memory, communication systems, system software, etc., may be incorporated into computer system 10.

Database 22 may provide storage for information necessary to carry out the present invention. Such information could include, among other things, tooltip content, content sizes, base times, time factors, display times, etc. As such, database 22 may include one or more storage devices, such as a magnetic disk drive or an optical disk drive. In another embodiment, database 22 includes data distributed across, for example, a local area network (LAN), wide area network (WAN) or a storage area network (SAN) (not shown). Database 22 may also be configured in such a way that one of ordinary skill in the art may interpret it to include one or more storage devices. It should be understood computer system 10 is intended to be representative of any type of computerized system. Examples include a server, a client, a workstation, a laptop, a personal digital assistant, etc.

Stored in memory 14 of computer system 12 is application 24. Under the present invention, application 24 is intended to represent any software program that generates a graphical user interface (GUI) and/or tooltips for user 36. Examples include, but are not limited to, word processing programs, spreadsheet programs, electronic mail programs, online service programs, etc. As described above, tooltips are textual and/or graphical descriptions that appear over an icon/control in a GUI. In general, a tooltip will appear when a mouse or other input device is "pointed" to a particular control in the GUI. The content that subsequently appears in the tooltip describes the underlying function of the particular control.

Figure 2:
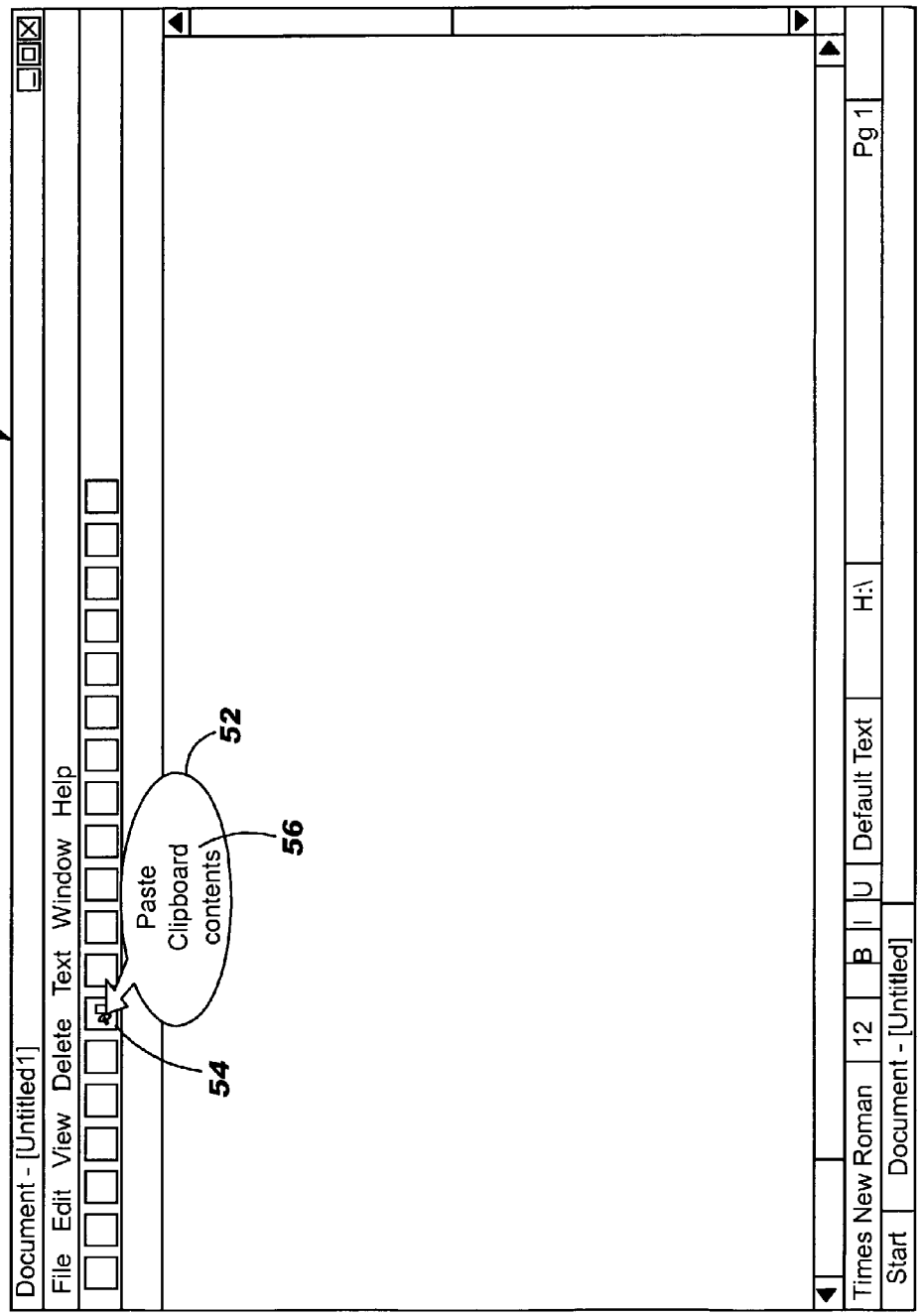
FIG. 2 depicts an exemplary graphical user interface (GUI) with a tooltip displayed according to the present invention.

Referring to FIG. 2, an exemplary GUI 50 is shown. When an input device is pointed to paste control 54, tooltip 52 is displayed. As depicted, tooltip 52 includes textual content 56 that reads "Paste Clipboard Contents." Because different controls have different functions, the content that appears within the tooltips can vary. Specifically, the content could include a few descriptive words (such as shown in tooltip 52), or several sentences. Moreover, the content could include graphical and/or video content alone, or in combination with textual content. Accordingly, different tooltips could take different amounts of time to fully observe and understand. Under previous systems, all tooltips were displayed for a fixed period of time, until the particular underlying control was selected, the input device was no longer pointing to the underlying control, or some keyboard action was taken. No previous alternative, however, optimized the displaying of the tooltip based on the content within the tooltip. The present invention, in contrast, displays a tooltip for a length of time that is dependent on the content within the tooltip.

Referring back to FIG. 1, tooltip system 26 according to one embodiment is shown as including generation system 28, content system 30, time system 32 and display system 34. Generation system 28 is intended to be representative of any system (e.g., set of program code) that generates tooltips such as tooltip 52 of FIG. 2. To this extent, generation system 28 could be any system already existing (or later developed) in application 26. In a typical embodiment, when user 36 "points" an input device to a particular control on a GUI, generation system 28 would detect the "pointing" action by user 36, and access database 22 to retrieve the corresponding content. To this extent, database 22 could include a tooltip table or the like that correlates controls with appropriate tooltip content. Below is an exemplary tooltip table that could be provided for generating tooltips.

| CONTROL | CONTENT |
|---|---|
| CUT | CUT TO CLIPBOARD |
| PASTE | PASTE FROM CLIPBOARD |
| OPEN FILE | OPEN FILE; XYZ.MPEG |

In any event, once the appropriate content has been identified, content system 30 will determine a size of the content. The size can be determined based on any known measurement. For example, for a textual tooltip, the size could be determined based on the quantity of characters in the content, a quantity of carriage returns, etc. Alternatively, the size could be based on a quantity of bytes of the content. A byte quantity is especially advantageous for determining content size if the tooltip includes a graphical or video clip description of the underlying control.

Once the size of the content has been determined, a display time based on the size will be calculated by time system 32. Under the present invention, the display time is calculated by using the size in a predetermined algorithm. In a typical embodiment, the algorithm is as follows:

Display Time ($Dt$)=Base Time ($Bt$)+[Time Factor ($Ft$)*Size ($S$)]

Specifically, the display time is calculated by summing a base time and a product of a time factor and the content size. The base time represents some minimal time for which all tooltips are displayed (e.g., 2 seconds). The time factor is a predetermined quantity of time per unit of size (e.g., characters, bytes, etc.) of the content (e.g., as stored in database 22). For example, if the base time was 2 seconds, content size was 10 characters and the time factor was 1 second/character, the display time would be 12 seconds or as follows:

12 seconds=2 seconds+(1second/character*10 characters)

After the display time has been calculated, display system 34 will display the tooltip (as generated by generation system 28) for the duration thereof, after which time display system 34 will close the tooltip.

It should be understood that depiction of application 24 and tooltip system 26 of FIG. 1 is intended to be illustrative only, and many variations exist. For example, although generation system 28 is shown as being part of tooltip system 26, it could be a separate system. Moreover, it should be understood that tooltip system 26 (with or without generation system 28) could be a part of application 24 as shown, or a separate program that works in conjunction with application 24. Regardless of the implementation, the underlying functions of tooltip system 26 (e.g., calculating a display time, and displaying the tooltip only for the duration of the display time) are still performed. In addition, it should be appreciated that the display time is typically calculated before the tooltip is displayed. However, because the calculation can be made rapidly, the display time could be calculated simultaneous to the display of the tooltip, or after the tooltip is initially displayed (as long as the tooltip is not displayed longer than the calculated display time).

Referring now to FIG. 3, a method flow diagram 100 according to the present invention is shown. As depicted, first step 102 is to provide a tooltip having content. Second step 104 is to determine a size of the content within the tooltip. Once determined, third step 106 is to determine a product by multiplying the size by a time factor. Fourth step 108 is to calculate a display time by summing the product and a base time. Once calculated, fifth step 110 is to display the tooltip. Once displayed, it will be determined whether the display time has elapsed in step 112. If it has not yet elapsed, the tool tip will continue to be displayed in step 110. If, however, the display time has elapsed, the tooltip will be closed in step 114.

As indicated above, it should be appreciated that the display time for a tooltip could based on a feature of the content other than its size. For example, the display time could be based on the type/complexity of the content. In this embodiment, the tooltip table described above (or a separate table) could associate a numeric value with the different types or complexities of content. For example, the association of numeric values with content types/complexities could be as follows:

| CONTENT TYPE/COMPLEXITY | NUMERIC VALUE (V) |
|---|---|
| TEXT | 3 |
| GRAPHICS | 4 |
| TEXT AND GRAPHICS | 5 |

When a tooltip is then generated, content system 30 would determine the content type/complexity, access the table, and pass the corresponding numeric value to time system 32. The algorithm then utilized by time system 32 would be similar to the algorithm set for above for basing display time on content size. Specifically, the algorithm would be as follows:

Display Time (Dt)=Base Time (Bt)+[Time Factor (Ft)*Value (V)]

Under this algorithm, however, the time factor would be a predetermined quantity of time per numeric value (V) (e.g., as stored in database 22). For example, if the base time was two seconds, the time factor was 3, and the content included both text and graphics, the display time would be calculated as follows:

17 seconds=2 seconds+(3 seconds/value*5 value)

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for displaying a tooltip based on content within the tooltip, comprising:
    determining a feature of the content within the tooltip;
    calculating a display time, comprising a duration of a total time of display for the tooltip, based on the feature of the content; and
    displaying the tooltip for the calculated display time.

2. The method of claim 1, further comprising closing the tooltip when the display time has elapsed.

3. The method of claim 1, wherein the feature is size that is determined based on a quantity of characters in the content.

4. The method of claim 1, wherein the feature is size that is determined based on a quantity of bytes in the content.

5. The method of claim 1, wherein the calculating step comprises:
    providing a base time;
    determining a product of a size and a time factor; and
    calculating the display time by summing the base time and the product.

6. The method of claim 5, wherein the time factor comprises a time quantity per unit of size of the content.

7. The method of claim 1, wherein the feature is a content type, and wherein the calculating step comprises:
    providing a base time;
    determining a product by multiplying a value corresponding to the content type and a time factor; and calculating the display time by summing the base time and the product.

8. A method for displaying a tooltip based on content within the tooltip, comprising:
determining a size of the content within the tooltip;
determining a product by multiplying the size by a predetermined time factor;
calculating a display time, comprising a duration of a total time of display for the tooltip, by summing the product and a base time; and
displaying the tooltip for the display time, wherein the tooltip is closed when for the display time has elapsed.

9. The method of claim 8, wherein the size is based on a quantity of characters in the tooltip.

10. The method of claim 8, wherein the size is based on a quantity of bytes in the tooltip.

11. The method of claim 8, wherein the time factor comprises a time quantity per unit of size of the content.

12. A system for displaying a tooltip based on content within the tooltip, comprising:
a content system for determining a size of the content within the tooltip;
a time system for calculating a display time, comprising a duration of a total time of display for the tooltip, based on the size; and
a display system for displaying the tooltip for the calculated display time duration.

13. The system of claim 12, further comprising a generation system for generating the tooltip.

14. The system of claim 12, wherein the size is determined based on a quantity of characters of the content.

15. The system of claim 12, wherein the size is determined based on a quantity of bytes of the content.

16. The system of claim 12, wherein display time is calculated by adding a product of a time factor and the size to a base time.

17. The system of claim 16, wherein the time factor comprises a time quantity per unit of size of the content.

18. The system of claim 12, wherein the tooltip is closed after the display time has elapsed.

19. A program product stored on a recordable medium for displaying a tooltip based on content within the tooltip, which when executed, comprises:
program code for determining a size of the content within the tooltip;
program code for calculating a display time, comprising a duration of a total time of display for the tooltip, on the size; and
program code for displaying the tooltip for the calculated display time.

20. The program product of claim 19, further comprising program code for generating the tooltip.

21. The program product of claim 19, wherein the size is determined based on a quantity of characters of the content.

22. The program product of claim 19, wherein the size is determined based on a quantity of bytes of the content.

23. The program product of claim 19, wherein display time is calculated by adding a product of a time factor and the size to a base time.

24. The program product of claim 23, wherein the time factor comprises a time quantity per unit of size of the content.

25. The program product of claim 19, wherein the tooltip is closed after the display time has elapsed.

* * * * *

UNITED STATES PATENT AND TRADEMARK OFFICE
CERTIFICATE OF CORRECTION

PATENT NO. : 7,107,530 B2 Page 1 of 1
APPLICATION NO. : 10/228005
DATED : September 12, 2006
INVENTOR(S) : J. Y. Blakely et al.

It is certified that error appears in the above-identified patent and that said Letters Patent is hereby corrected as shown below:

Col. 8, line 14
insert --based-- between "tooltip," and "on""

Signed and Sealed this

Fifth Day of December, 2006

JON W. DUDAS
*Director of the United States Patent and Trademark Office*